(12) United States Patent
Pabla et al.

(10) Patent No.: US 11,865,622 B2
(45) Date of Patent: Jan. 9, 2024

(54) OXIDATION AND WEAR RESISTANT BRAZED COATING

(71) Applicant: General Electric Company, Schenectady, NY (US)

(72) Inventors: Surinder Singh Pabla, Greer, SC (US); Srikanth C. Kottilingam, Greenville, SC (US); David Vincent Bucci, Simpsonville, SC (US); Biju Dasan, Bangalore (IN)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 17/461,246

(22) Filed: Aug. 30, 2021

(65) Prior Publication Data

US 2023/0068810 A1 Mar. 2, 2023

(51) Int. Cl.
*B22F 7/08* (2006.01)
*B23K 1/00* (2006.01)

(52) U.S. Cl.
CPC .............. *B22F 7/08* (2013.01); *B23K 1/0018* (2013.01); *B22F 2301/05* (2013.01); *B22F 2302/253* (2013.01)

(58) Field of Classification Search
CPC ............ B23K 1/0018; B23K 2101/001; B23K 35/0244; B23K 35/304; B23K 35/3046; B23K 35/3033; B22F 2301/15; B22F 2302/253; B22F 7/08; B22F 7/062; F05D 2230/90; C22C 1/0416; C22C 1/05; C22C 21/00; C22C 32/0047; C22C 19/03; C22C 19/05; C22C 19/07; F01D 5/286; F01D 5/288; F01D 25/005; F01D 25/007

USPC ......................................................... 148/217
See application file for complete search history.

(56) References Cited

U.S. PATENT DOCUMENTS

| | | | |
|---|---|---|---|
| 2003/0183529 A1* | 10/2003 | Ohara | C23C 28/44 205/110 |
| 2018/0345396 A1* | 12/2018 | Kottilingam | F01D 5/005 |
| 2019/0039141 A1* | 2/2019 | Cui | C22C 30/00 |

FOREIGN PATENT DOCUMENTS

| | | | | |
|---|---|---|---|---|
| EP | 3744864 A1 | * | 12/2020 | B22F 1/0003 |
| WO | 2020239369 A1 | | 12/2020 | |

OTHER PUBLICATIONS

American Elements, Aluminum Oxide Particles (Year: 2023).*
Bauer et al. "Microstructure and mechanical characterization of SLM processed Haynes 230" (Year: 2023).*
Hoganas, BrazeLet BNi2 (Year: 2023).*

(Continued)

*Primary Examiner* — Brian D Walck
*Assistant Examiner* — Danielle Carda
(74) *Attorney, Agent, or Firm* — Fletcher Yoder, P.C.

(57) ABSTRACT

A method includes applying a material coating to a surface of a machine component, wherein the material coating is formed from a combination of a hardfacing material, aluminum-containing particles, and a braze material. The method also includes thermally treating the material coating at a temperature to generate an oxide layer comprising aluminum from the aluminum-containing particles, wherein the oxide layer is configured to reduce oxidation of the hardfacing material, and the braze material is configured to facilitate binding between the material coating and the surface of the machine component.

9 Claims, 4 Drawing Sheets

(56) References Cited

OTHER PUBLICATIONS

Zakeri et al., Study on production of modified MCrAlY powder with nano oxide dispersoids as HVOF thermal spray feedstock using mechanical milling, 2020 Mater. Res. Express 7 (2020) (Year: 2020).*

European Search Report; EP Application No. EP 22190690; dated Jan. 20, 2023.

* cited by examiner

OXIDATION AND WEAR RESISTANT BRAZED COATING

BACKGROUND

The subject matter disclosed herein relates to forming a material coating with oxidation and mechanical wear resistance using a brazing process.

A gas turbine, or gas turbine engine, may include an air intake section, a compressor section, a combustion section, a turbine section, and an exhaust section. In operation, the air intake section receives an intake air from the ambient environment, and the compressor section compresses the intake air. The compressed air flows to the combustion section, which uses the compressed air for combustion of one or more fuels to generate a hot combustion gas. The hot combustion gas drives rotation of the turbine section, which in turn drives the compressor section and one or more loads, such as a generator.

During operation of the gas turbine, the components of the gas turbine may be subjected to a variety of conditions (e.g., mechanical contact, relatively high temperatures during combustion, and relatively low temperatures) that may cause wear to the components. For example, bucket interlocks of the gas turbine may be subjected to high temperature (e.g., greater than 500° C., 600° C., 700° C., 800° C., 900° C., and the like) fretting motion, such as when the respective buckets lock up due to centrifugal and aerodynamic forces. Further, the bucket interlocks may be subjected to relatively low temperature (e.g., ambient temperature) fluttering (e.g., during startup of the gas turbine), which may cause mechanical contact along the bucket interlocks. Certain components (e.g., bucket interlocks) may include a coating that reduces the mechanical resistance of the component during certain portions of the operation. The coating may form an oxide layer at the relatively high temperatures disclosed above.

BRIEF DESCRIPTION

Certain embodiments commensurate in scope with the originally filed claims are summarized below. These embodiments are not intended to limit the scope of the present technology, but rather these embodiments are intended only to provide a brief summary of possible forms of the technology. Indeed, the present system and method may encompass a variety of forms that may be similar to or different from the embodiments set forth below.

In certain embodiments, a method includes applying a material coating to a surface of a machine component, wherein the material coating is formed from a combination of a hardfacing material, aluminum-containing particles, and a braze material. The method also includes thermally treating the material coating at a temperature to generate an oxide layer comprising aluminum from the aluminum-containing particles, wherein the oxide layer is configured to reduce oxidation of the hardfacing material, and the braze material is configured to facilitate binding between the material coating and the surface of the machine component.

In certain embodiments, a machine component includes a material coating applied to a surface of the machine component. The material coating includes a layer having a first plurality of phases of a hardfacing material and an aluminum-containing material, and a second plurality of phases of a braze material. The aluminum-containing material is configured to oxidize to reduce beta depletion of the hardfacing material. The braze material is configured to couple the layer to the surface of the machine component.

In certain embodiments, a machine component includes a material coating. The material includes a first layer having a hardfacing material, an aluminum-containing material, and a nickel-based braze material, wherein the first layer is formed by heat treating a mixture of the hardfacing material, the aluminum-containing material, and the nickel-based braze material at a brazing temperature of the nickel-based braze material to couple the nickel-based braze material with a surface of the machine component. The material coating also includes a second layer formed by heat treatment of the first layer. The second layer comprises crystalline intermetallic phases of the aluminum-containing material.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various examples of the present disclosure, the articles "a," "an," "the," and "said" are intended to mean that there are one or more of the elements. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional examples that also incorporate the recited features.

In the present context, the term "about" or "approximately" is intended to mean that the values indicated are not exact and that the actual value may vary from those indicated in a manner that does not materially alter the operation concerned. For example, the term "about" or "approximately" as used herein is intended to convey a suitable value that is within a particular tolerance (e.g., ±10%, ±5%, ±1%, ±0.5%), as would be understood by one skilled in the art.

As generally discussed above, one or more components of a gas turbine may include a material coating that enhances the mechanical wear resistance of the component. When the components of the gas turbine operate at relatively high temperatures (e.g., greater than 500° C., 600° C., 700° C., 800° C., 900° C., and the like), such while the components are exposed to combustion gases, a portion of the material coating may oxidize to form an oxide layer.

The present disclosure is directed to techniques for improving the longevity of a machine component (e.g., a component of a gas turbine) by combining an oxidation wear resistant (OWR) material, a braze material, and a mechanical wear resistant (MWR) material to form a pre-sintered preform (PSP) and by applying the PSP including the combination or mixture of the materials onto a surface of the component and thermally treating the applied PSP to produce an oxidation and mechanical wear resistant (OMWR) brazed coating. The braze material of the PSP may facilitate binding of the OWR material and the MWR material with a substrate, such as the machine component, via wetting between the braze material and a material of the substrate. As discussed in more detail herein, the OWR material may block, reduce, or mitigate oxidation of the MWR material. For example, the OWR material may include aluminum-containing material(s) (e.g., aluminum-based materials such as aluminum, aluminum oxide, or aluminum-containing alloys such as CoNiCrAlY particles, or both) that form an OWR oxide layer, which is a self-limiting oxide layer. As referred to herein, an "aluminum-containing" material includes aluminum and an "aluminum-based" material includes aluminum as the predominant metal or cation. That is, when oxygen is present, at least a portion of the aluminum (e.g., originating from the aluminum-containing material(s) of the OWR material) in the OMWR brazed coating (e.g., material coating) may oxidize to form the OWR oxide layer that terminates after a few microns (i.e., micrometers) (e.g., approximately 10 microns, less than 10 microns, approximately 5 microns). A thickness of the self-limiting oxide layer may be less than a thickness of an oxide layer formed by a material that does not readily produce a self-limiting oxide layer, such as the MWR material. Moreover, the OWR oxide layer may also reduce a rate of consumption of the MWR material by reducing oxidation and subsequent erosion of the MWR material, while maintaining a relatively small thickness of the coating. Accordingly, utilizing the OMWR brazed coating may reduce operational costs associated with reapplication of a worn coating and/or replacement of a worn component. It is noted that by the OMWR brazed coating forming the OWR oxide layer, which is self-limiting, the OMWR brazed coating may have improved longevity as compared to certain existing coatings. For example, because the OWR oxide layer is self-limiting, less of the OWR oxide layer forms, and thus, less of the OWR material is consumed. Further, the OWR oxide layer may prevent beta depletion of the MWR material within in the OMWR brazed coating. Accordingly, a component coated with the OMWR material that is repeatedly subjected to the relatively high temperatures may erode more slowly than components coated with certain existing coatings. As the OMWR material erodes more slowly, the component coated with the OMWR material is provided with mechanical wear resistance for a longer duration.

Figure 1:
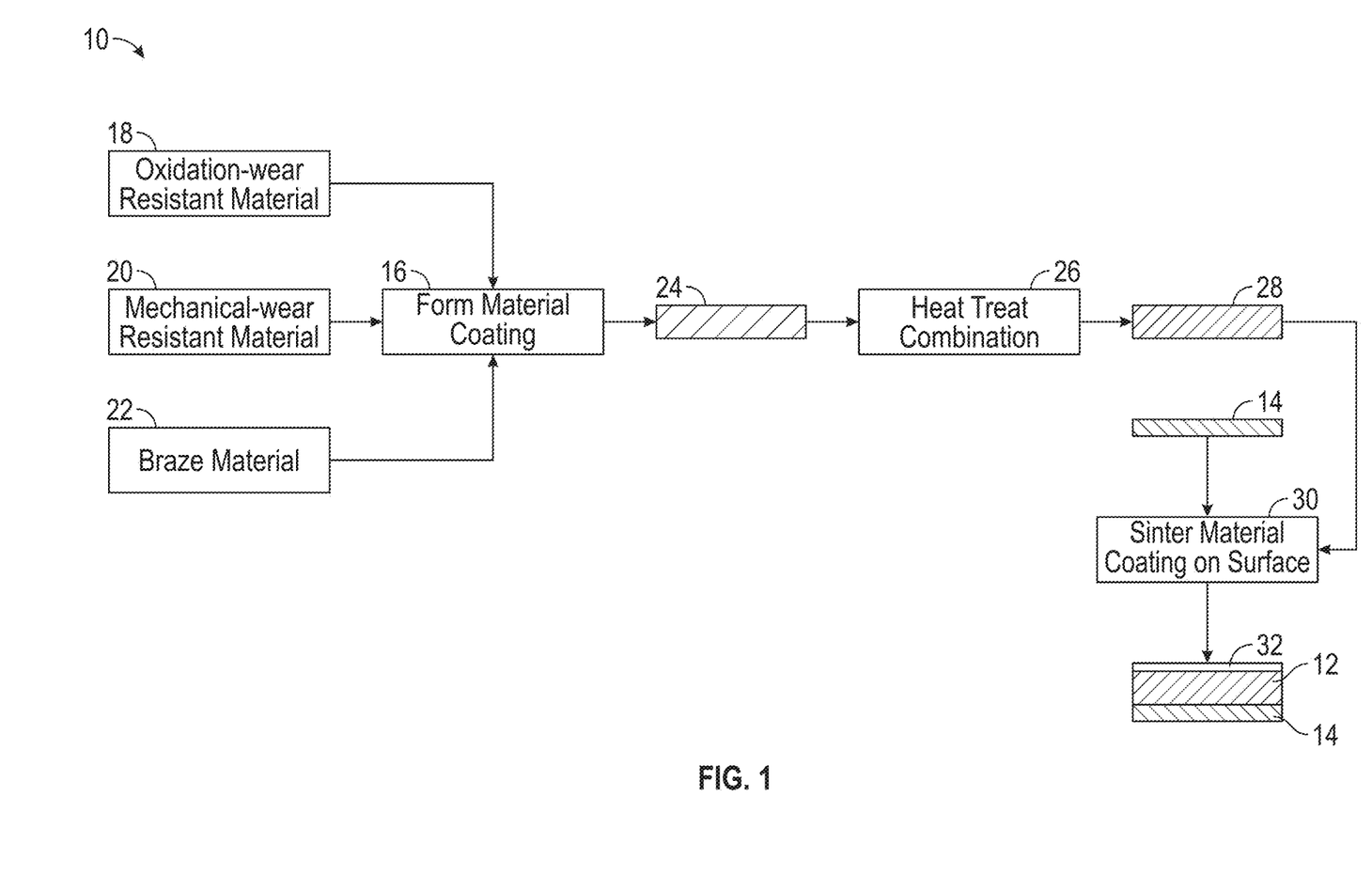
FIG. 1 is a flow diagram of an embodiment of a process for producing an oxidation and mechanical wear resistant (OMWR) brazed coating, in accordance with the present disclosure.

With this in mind, FIG. 1 is a flow diagram of an embodiment of a process 10 for producing an OMWR brazed coating 12 (e.g., material coating) on a substrate 14 (e.g., a machine component) that enhances mechanical wear resistance and oxidation resistance of the substrate 14. As described herein, the substrate 14 may be a component of a gas turbine, such as part of a combustion section, bucket, bucket interlock, or another component of the gas turbine that may be subjected to relatively high temperatures (e.g., greater than 800° C.) and mechanical contact during operation. The steps illustrated in the process 10 are meant to facilitate discussion and are not intended to limit the scope of this disclosure, because additional steps may be performed, certain steps may be omitted, and the illustrated steps may be performed in an alternative order or in parallel, where appropriate.

To start the process 10, at block 16, an OWR material 18, an MWR material 20, and a braze material 22 are combined, mixed, or otherwise integrated to form an OMWR braze mixture 24. The OWR material 18 is generally a material that forms a self-limiting oxide layer that is a solid at relatively high temperatures (e.g., greater than 800° C. The OWR material may include certain aluminum-containing material(s). Certain non-limiting examples of such aluminum-containing material(s) include aluminum, aluminum oxide, and aluminum-containing alloy(s) (e.g., CoNiCrAlY, MCrAlY, MCrAl, where M=Fe, Co, Ni, or any combination thereof). The OWR material 18 may include micron-sized particles, nanoparticles, or larger-sized particles, of the aluminum based material(s). In some embodiments, the OWR material 18 consists essentially of aluminum (e.g., as a metal, intermetallic, or alloy) or alumina (e.g., aluminum oxide).

The MWR material 20 may include a hardfacing material, whether a micron-sized particle, nanoparticle, or larger size particle. In general, hardfacing materials including metals that may be applied to improve hardness to a surface underneath. The hardfacing material may include transition metal carbide(s), e.g., including carbide(s) with chromium, tungsten, vanadium, molybdenum, other suitable element(s), or a combination thereof. Additionally or alternatively, the hardfacing material may include certain transition metal alloy(s), including cobalt alloy(s), molybdenum alloy(s), chromium alloy(s), nickel alloy(s), other suitable alloy(s), or a combination thereof. For example, the MWR material may have a general composition of M-Mo—Cr—Si (M=Co or Ni), such as Tribaloy® (e.g., T800 or Co800 particles) from Deloro Stellite Holdings Corporation, a Kennametal Company. In an embodiment where the OWR material 18 and/or the MWR material 20 are particles (e.g., micron-sized particles, nanoparticles, or larger particles), the particles may have a distribution of shapes. For example, the OWR material 18 may include micron-sized particles that are 10%, 20%, 30%, 40%, 50%, 60%, 70%, 80% 90%, or 95% spherical, and the MWR material 20 may include nano-size particles that are 10%, 20%, 30%, 40%, 50%, 60%, 70%, 80% 90%, or 95% spherical. At least in some instances, the combination of particle shape (e.g., spherical) and different size distributions may improve the properties of the result OMWR coating 12 discussed herein.

The braze material 22 may include a material having a relatively lower melting point than the MWR material 20 and/or the OWR material 18. In general, the braze material 22 is capable of wetting boron and/or silicon melting point depressants. In some embodiments, the braze material includes a nickel-based material. For example, the nickel-based material may include (i.e., using the American Welding Society (AWS) designations) BNi-2, BNi-5, BNi-9, or a combination thereof. The braze material may have a general composition of nickel and chromium. For example, a BNi-2 material may include approximately 6-8% chromium, 2.75-3.5% boron, 4-5% silicon, and 2.5-3.5% iron. At least in some instances, the braze material 22 may include aluminum (e.g., 0.01%, 0.02%, 0.03%, 0.04%, or 0.05% aluminum). However, the amount of aluminum in the braze material 22 may be low relative to the amount of aluminum in the OWR material 18 and, thus, contribute relatively less or not at all to the OWR oxide. In some embodiments, the braze material 22 may include DF4B, BCo-1, MarM509B, or a combination thereof.

At block 26, the OMWR braze mixture 24 is thermally treated to form an OMWR PSP 28. In general, the OMWR braze mixture 24 is thermally treated at a temperature below the brazing temperature of the braze material 22. Thermally treating the OMWR braze mixture 24 includes heating the OMWR braze mixture 24 to a relatively high temperature, such as approximately 500° C., approximately 600° C., approximately 700° C., approximately 800° C., or greater than 800° C., for a predetermined time period. The time period may be 1 hour, 5 hours, 10 hours, 20 hours, or greater than 20 hours.

At block 30, the OMWR PSP 28 is applied to the substrate 14 and heated (e.g., brazed) to generate the OMWR brazed coating 12 on the substrate 14. In general, the brazing is performed at or above the brazing temperature of the braze material 22 and under low pressure (e.g., $10^{-2}$ Torr, $10^{-3}$ Torr, $10^{-4}$ Torr, or $10^{-5}$ Torr) for a predetermined time period. The brazing temperature is generally a relatively higher temperature than the temperature used for thermally treating the OMWR braze mixture 24, such as approximately 1000° C., approximately 1100° C., approximately 1200° C., approximately 1300° C., or greater than approximately 1300° C., for a predetermined time period. The time period may be 1 hour, 5 hours, 10 hours, 20 hours, or greater than 20 hours.

Additionally, the OMWR brazed coating 12 may include an OWR oxide layer 32 that may form while the substrate 14 coated with the OMWR brazed coating 12 is in use. The OWR oxide layer 32 may include an aluminum-based oxide layer that provides oxidation wear resistance to a mechanical wear resistant layer that includes a combination of the OWR material and the MWR material. In some embodiments, the OWR oxide layer 32 may form by thermally treating the OMWR brazed coating 12, such as before the component (e.g., the substrate 14) is used within a gas turbine. At least in some instances, thermally treating the OMWR brazed coating 12 may include heating the OMWR brazed coating 12 in a furnace capable of reaching the relatively high temperature suitable for forming the OWR oxide layer 32. In some embodiments, thermally treating the OMWR brazed coating 12 may include operating the machine (e.g., the gas turbine) with one or more surfaces of the component of the machine coated with the OMWR brazed coating, and thus facilitating formation of the OWR oxide layer 32 during operation.

Figure 2:
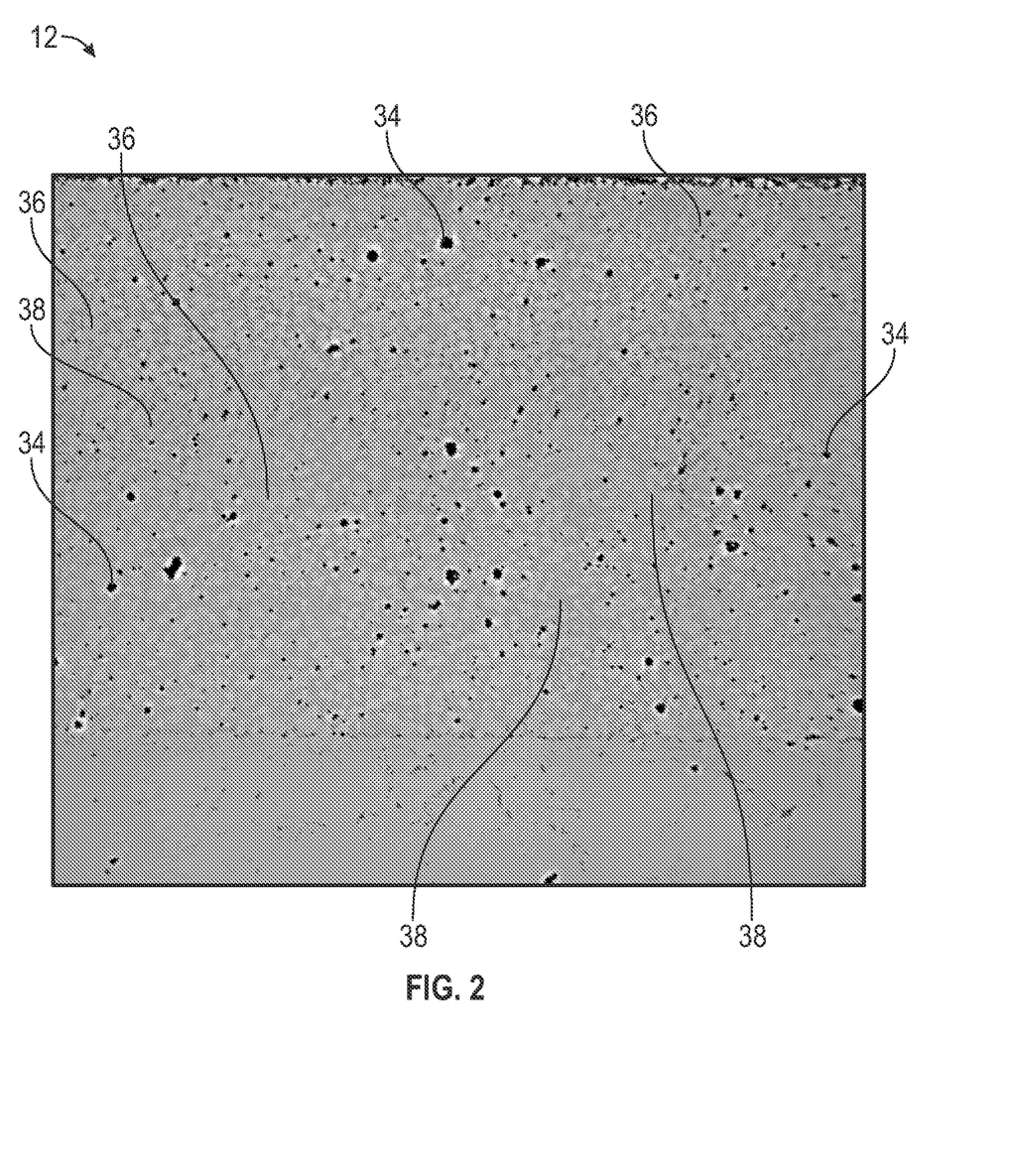
FIG. 2 is a cross-sectional view of an embodiment of a material coating formed with a braze material, in accordance with the present disclosure.
Figure 4A:
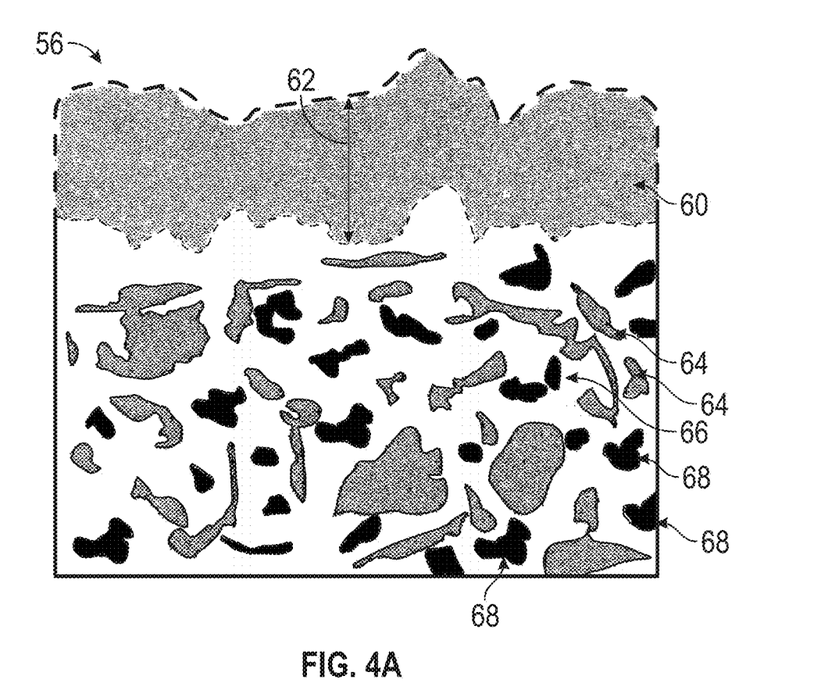
FIG. 4A is a schematic diagram of an embodiment of a material coating formed without the OWR material, in accordance with the present disclosure.
Figure 4B:
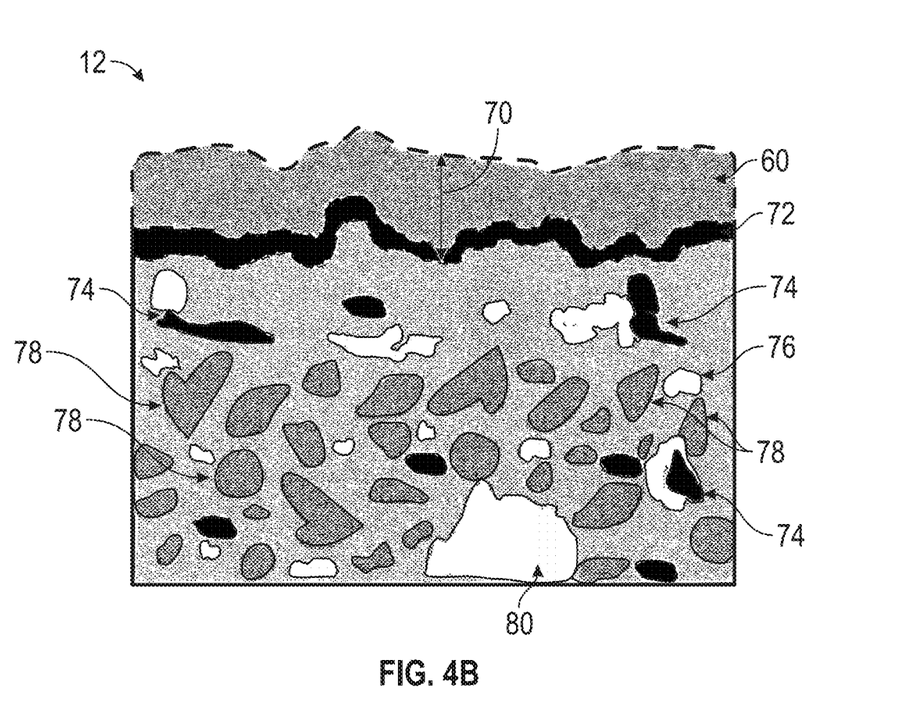
FIG. 4B is a schematic diagram of an embodiment of a material coating having an oxide layer formed by an oxidation wear resistant material, in accordance with the present disclosure.

The OMWR brazed coating 12 may include different phases formed from the OWR material 18, the braze material 22, and the MWR material 20, as discussed in more detail with respect to FIGS. 2, 4A, and 4B. For example, in an embodiment in which the MWR material 20 includes Co—Mo—Cr—Si, the OMWR brazed coating 12 formed by the deposition of the OWR and MWR materials may include a Co—Mo—Si phase, a Co-matrix, and Cr-containing regions. In embodiments in which the OWR material 18 includes aluminum oxide, the OMWR brazed coating may include phase(s) of alumina, such as gamma phase and/or beta phase.

In general, the OMWR braze mixture 24 includes a combination or mixture of the oxidation-wear resistant material 18, the mechanical-wear resistant material 20, and the braze material 22. For example, the OMWR braze mixture 24 may include 5% by weight of the braze material 22 and 95% by weight of the oxidation-wear resistant material 18 and the mechanical-wear resistant material 20, 10% by weight of the braze material 22 and 90% by weight of the oxidation-wear resistant material 18 and the mechanical-wear resistant material 20, 15% by weight of the braze material 22 and 85% by weight of the oxidation-wear resistant material 18 and the mechanical-wear resistant material 20, 20% by weight of the braze material 22 and 80% by weight of the oxidation-wear resistant material 18 and the mechanical-wear resistant material 20, or 25% by weight of the braze material 22 and 75% by weight of the oxidation-wear resistant material 18 and the mechanical-wear resistant material 20. The relative percentages of the oxidation-wear resistant material 18 and the mechanical-wear resistant material 20 may include 30% by weight of the OWR material 18 and 70% by weight of the MWR material 20, 50% by weight of the OWR material 18 and 50% by weight of the MWR material 20, or 70% by weight of the OWR material 18 and 30% by weight of the MWR material 20. At least in some instances, using less of the OWR material 18 may provide more wear resistance (e.g., both oxidation resistance and wear resistance). For example, an OMWR brazed coating 12 formed using 30% by weight of the OWR material 18 and 70% by weight of the MWR material 20 may provide increased oxidation resistance than an OMWR brazed coating 12 formed using 70% by weight of the OWR material 18 and 30% by weight of the MWR material 20.

In some embodiments, the OMWR brazed coating 12 (e.g., and the substrate 14 coated with the OMWR brazed coating) may be pre-heat treated, which may precipitate sub-micrometric crystalline intermetallic phases (e.g., from the OWR material and/or the MWR material) present in the OMWR brazed coating 12. That is, before thermally treating the OMWR brazed coating 12 to grow the OWR oxide layer 32 on the OMWR brazed coating 12, the OMWR brazed coating 12 may be heated at a relatively lower temperature and/or in the presence of an inert gas or relatively oxygen-free environment. For example, in embodiments in which the OMWR brazed coating 12 includes an aluminum-containing material (e.g., the OMWR brazed coating 12 includes an alumina phase originally from the deposited OWR material 18), pre-heat treatment may produce a continuous aluminum scale at the surface of the OMWR brazed coating 12, which may be below the solution and age heat treatment of the alloy. The aluminum scale formed by pre-heat treatment may establish improved wear properties at temperatures greater than approximately 900° C.

In certain embodiments, the MWR material 20 may include Co800 particles, and the OWR material may include a Co-based alloy that includes aluminum, such as CoNiCrAlY particles. In such embodiments, the resulting OMWR brazed coating 12 may include Co800 regions (e.g., splats) that are proximate to at least one source of aluminum from the CoNiCrAlY particles (e.g., within the diffusion distance of the aluminum at a temperature greater than 1500 F). When the OMWR brazed coating 12 is exposed to a relatively high temperature, a relatively thin layer of aluminum oxide based thermally grown oxide (TGO) (i.e., the OWR oxide) is formed (e.g., less than 5 microns thick after 2000 hours of exposure at 1700 F to 1800 F or 927° C. to 982° C.) that provides oxidation protection. Because the resulting oxide scale (e.g., the OWR oxide layer 32) is relatively thin (e.g., less than 10 microns), the oxide scale may be flexible so that the oxide layer does not crack (i.e., in response to contact with the oxide scale and another surface or due to a difference between thermal expansion coefficients of the oxide scale and the material layer below) cushioned by tougher metal underneath during impact and continue to provide protection to the layer(s) below, including the MWR material 20. Because the presence of the OWR material causes a thinner oxide layer (i.e., the OWR oxide layer) to form, even if the oxide scale is removed after subsequent oxidation and wear, the OMWR brazed coating 12 may have greater longevity than a material coating formed without the OWR material 18, thereby increasing the service life of the component. The material combination disclosed herein develops a thin and protective aluminum oxide scale, which reduces degradation mechanisms, such as beta depletion of the CoNiCrAlY phase.

In another embodiment, the OWR material 18 may include a mixture of particles. For example, the OWR material 18 may include a mixture of CoNiCrAlY particles and aluminum oxide particles. Using both CoNiCrAlY and aluminum oxide may improve the wear resistance of the material. For example, the OWR oxide layer formed by the aluminum oxide may reinforce the wear resistance of the OWR oxide layer formed by the aluminum present in the CoNiCrAlY This material combination develops a thin and protective aluminum oxide scale (i.e., the OWR oxide layer), which reduces degradation mechanisms, such as beta depletion of the CoNiCrAlY phase. The mixture may be combined with the wear resistant material 20 and the braze material 22 to produce the OMWR braze mixture 24.

In some embodiments, at least one of the OWR material 18 or the MWR material 20 may include particles having different size distributions (e.g., a first size distribution, a second size distribution, and a third size distribution). For example, the OWR material 18 may include a first plurality of aluminum oxide particles having a nano-size distribution (e.g., having an average diameter of approximately 5 nm, 10 nm, 50 nm, 100 nm, 200 nm, 500 nm, and the like). Additionally, the OWR material 18 may include a second plurality of aluminum oxide particles having a micro-size distribution (e.g., having an average diameter of approximately 1 µm, 5 µm, 10 µm, 50 µm, 100 µm, 200 µm, 500 µm, and the like).

In some embodiments, both the OWR material 18 and the MWR material 20 may include particles having different size distributions. That is, the OWR material 18 may include particles of a first size distribution and the MWR material 20 may include particles having a second size distribution. For example, the OWR material 18 may include CoNiCrAlY particles and the MWR material may include aluminum oxide. The OWR materials 18 may have a micron-size distribution and the MWR material 20 may have a nano-size distribution. In some embodiments, the OWR materials 18 may have a nano-size distribution and the MWR material 20 may have a micron-size distribution. At least in some instances, a bimodal size distribution may improve wear resistance. In an embodiment where the OWR material 18 and the MWR material 20 include particles having different size distributions, the mixture of the particles may vary. For example, the mixture may include 10%, 20%, 30%, 40%, 50%, 60%, 70%, and the like, by weight, of the OWR material 18 and 90%, 80%, 70%, 60%, 50%, 40%, 30%, and the like, by weight, of the MWR material 20.

As discussed herein, the OMWR brazed coating 12 may include phases from the braze material 22. To illustrate this, FIG. 2 is a cross-sectional view of an embodiment of an applied OMWR brazed coating 12. As illustrated, the applied OMWR brazed coating 12 includes pull out regions 34, an oxidation and OMWR coating phase 36, and a braze phase 38. The pull out regions 34 may result from polishing of the OMWR brazed coating 12 or the OMWR PSP 28 during the process described above with respect to FIG. 1.

As discussed herein, the OMWR brazed coating 12 may form an OWR oxide layer 32 that reduces erosion of the OMWR brazed coating 12. To illustrate the OMWR brazed coating 12, FIGS. 3A and 3B are cross-sectional views of an embodiment of an applied MWR material coating 40 that does not include OWR material 18 and an embodiment of an applied OMWR material coating 12 that includes the OWR oxide layer 32, respectively, and each coating includes an oxide layer formed from the material(s) disposed onto the substrate.

Figure 3A:
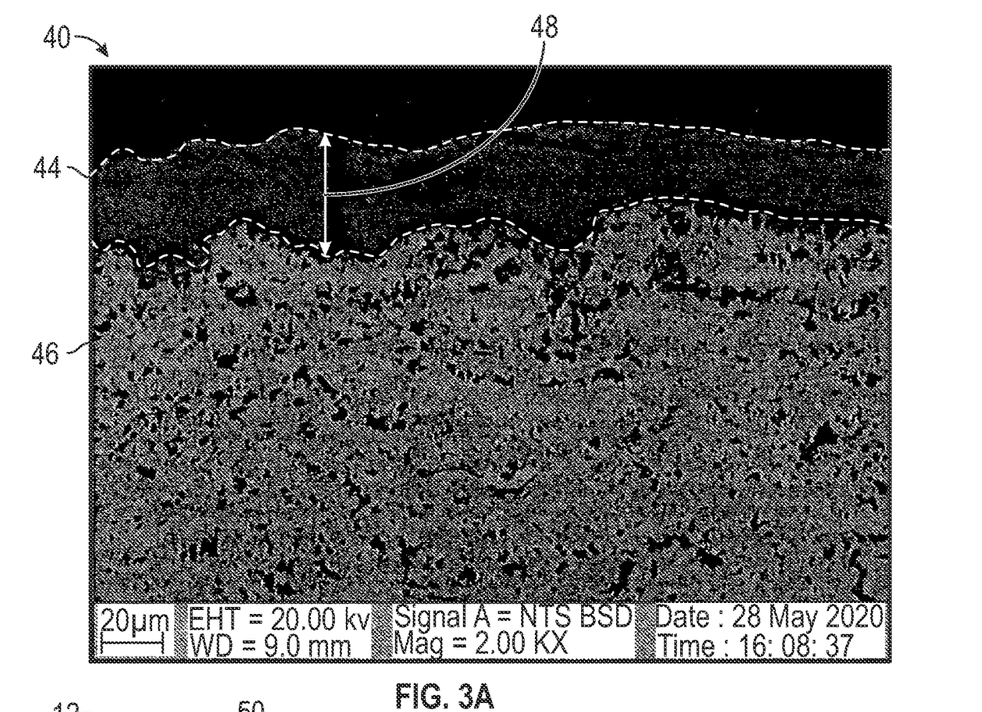
FIG. 3A is a cross-sectional view of an embodiment of a material coating formed without an oxidation wear resistant (OWR) material, in accordance with the present disclosure.

In FIG. 3A, the applied MWR material coating 40 has an MWR oxide layer 44, which may be formed after exposure to a relatively high temperature (e.g., greater than 1500 F or 815° C.). As described herein, the MWR oxide layer 44 may be less wear resistant than the material present in the MWR deposition layer 46. Accordingly, the MWR oxide layer 44 may erode after forming due to mechanical contact with another object. It should be noted that an additional MWR oxide layer may form after subsequent exposure of the MWR deposition layer 46 to relatively high temperatures. Accordingly, repeated formation of the MWR oxide layer 44 may gradually erode the MWR material coating 40 due to beta depletion mechanisms. As shown in FIG. 3A, the MWR oxide layer 44 has a thickness 48 of approximately 20 microns, which may be relatively thicker than an oxide layer formed using an OWR material, as discussed herein. It should be noted that the substrate (not shown) is generally below the MWR material coating 40 and the MWR oxide layer 44 forms above the MWR material coating 40.

Figure 3B:
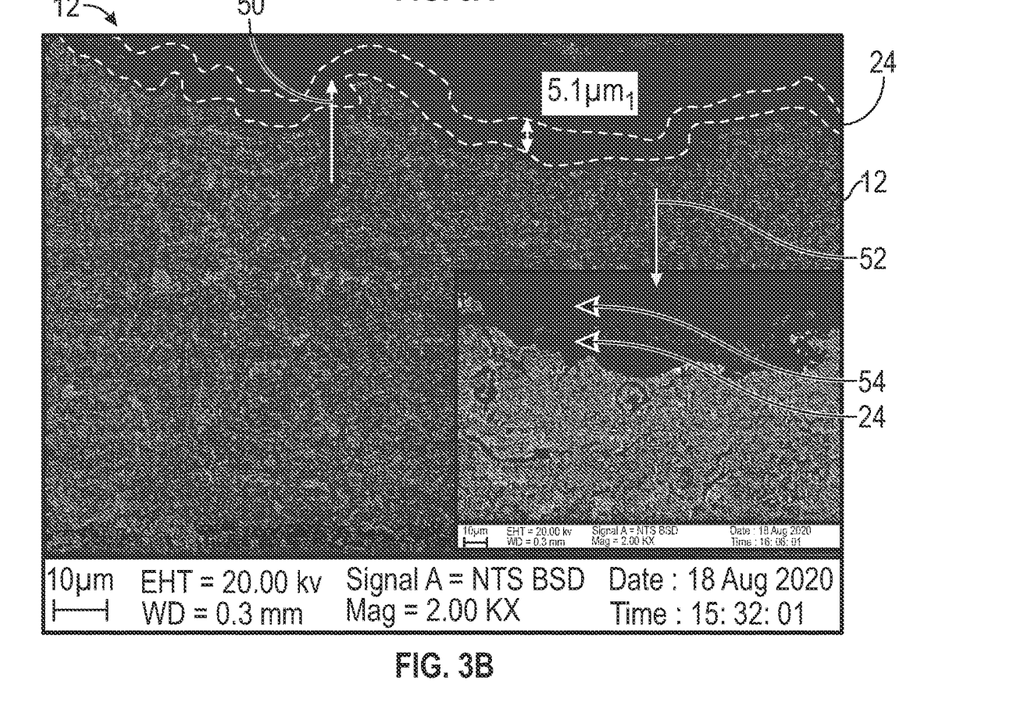
FIG. 3B is a cross-sectional view of an embodiment of a material coating having an oxide layer formed by an oxidation wear resistant material, in accordance with the present disclosure.

FIG. 3B is a cross-sectional view of an embodiment of an OMWR brazed coating 12 applied on a substrate (e.g., the substrate 14) having an OWR oxide layer 32 formed by the OWR material on top of the OMWR brazed coating 12. As described herein, the OWR oxide layer 32 may be self-limiting, and thus while the OWR oxide layer 32 may erode after forming (e.g., due to mechanical wear at relatively low and/or relatively high temperatures), less of the OWR material may be consumed during subsequent exposure of the OMWR brazed coating 12 to relatively high temperatures (e.g., as compared to the embodiment of FIG. 3A). Accordingly, the OMWR brazed coating 12 may provide mechanical wear resistance to the substrate (e.g., the bucket interlocks) for a relatively longer period of time than the MWR material coating disclosed above with reference to FIG. 3A. As also shown in FIG. 3B, the thickness 50 of the OWR oxide layer 32 is less than 10 microns, and thus thinner than the oxide layer formed on the MWR material of the coating of FIG. 3A. As discussed herein, the OWR oxide may be a material that forms a self-limiting oxide layer that may not continue to grow in certain conditions (e.g., temperature and pressure) beyond a certain thickness. Accordingly, less of the material used to form the OMWR brazed coating 12 is consumed each time the OWR oxide layer 32 is formed. FIG. 3B also includes an inset cross-sectional view 52 of the OMWR brazed coating 12. As shown, an additional oxide layer 54 is present on the OWR oxide layer 32. The additional oxide layer 54 may be formed of the MWR material present in the OMWR brazed coating 12. For example, in an embodiment in which the MWR material 20 is a cobalt or chromium-based alloy and is used the produce the OMWR brazed coating 12, the additional oxide layer 54 may include cobalt oxide and/or chromium oxide. The additional oxide layer 54 is relatively thin compared to the oxide layer of FIG. 3A that is formed without the OWR material, and thus, less of the MWR material used to produce the OMWR brazed coating 12 is consumed by the oxidation process.

As discussed herein, the OMWR brazed coating 12 may include regions formed from the OWR material 18 and the MWR material 20. To illustrate this, FIGS. 4A and 4B are schematic diagrams of an embodiment of an MWR material coating 56 (e.g., material coating formed without OWR material) and an embodiment of an OMWR material coating 12 (e.g., having an OWR oxide layer formed by the OWR material), respectively. In the illustrated embodiment, the MWR material 20 of the MWR coating 56 and the OMWR material coating 12 includes Co—Mo—Si—Cr. As shown in FIG. 4A, the MWR material coating 56 includes a material oxide scale region 60 having a first thickness 62, which may include cobalt, chromium, and oxides of both. The MWR material coating 56 also includes a matrix region 64 which may be a cobalt-matrix, an alloy region 66, which may include a Co—Mo—Si phase, and an oxidized alloy region 68, which may include oxidized Co—Mo—Si.

Turning to FIG. 4B, the OMWR material coating 12 includes a material oxide scale region 60 having a thickness 70 that is smaller than the thickness of the material oxide scale region of the MWR material coating of FIG. 4A, which may indicate that less MWR material is consumed as a result of the oxide (i.e., the OWR oxide layer) forming. Below the self-limiting oxide layer 72, the OMWR material coating 12 includes a beta depletion zone 74, a gamma matrix region 76, a beta phase region 78, an alloy region 66, and an oxidized alloy region 80. The gamma matrix region 76 and the beta phase region 78 may be formed of the OWR material, and thus may include aluminum oxide. Accordingly, at least a portion of these regions may be eroded upon oxidation and formation of the self-limiting oxide layer 72. While the OMWR material coating 12 includes the oxidized alloy region 80, there is less of the oxidized alloy region 80 as compared to an amount of the oxidized alloy region 68, shown in FIG. 4A. Thus, this indicates there is less erosion of the regions resulting from the MWR material 20 in the OMWR material coating as compared to the MWR material coating 56.

FIG. 4B illustrates different regions that may form within the OMWR brazed coating 12 discussed herein. As discussed herein, the coating (e.g., the OMWR material coating 12 and the MWR coating 56) may include various Laves phases. For example, in embodiments in which the MWR material includes a Co—Mo—Cr—Si material, the alloy region 66 may include such Laves phases as $Co_2Mo_2Si$ and CoMoSi. As shown in the illustrated embodiment of FIG. 4B, the alloy regions 66 are dispersed among the gamma matrix region 76.

Accordingly, the present disclosure relates to an OMWR brazed coating that enhances oxidation wear resistance and mechanical wear resistance of a component, such as a component of a gas turbine, that may be subjected to relatively high temperatures (e.g., greater than 1500 F) and relatively low temperatures (e.g., ambient temperature, less than 1500 F) during operation. The OMWR brazed coating may reduce or eliminate the formation of relatively thick oxides (e.g., oxide scales), and thus reduce a rate of erosion of the OMWR brazed coating, thereby enabling the component to be utilized for longer periods of time. In some embodiments, the OMWR brazed coating is formed by applying a PSP formed from a mixture of a first material, a second material, and a third material onto a substrate. The first material (e.g., the MWR material 20) may have a relatively high mechanical wear resistance, and the second material (e.g., the OWR material 18) may have a relatively high oxidation resistance. The third material (e.g., the braze material 22) may be capable of wetting boron and/or silicon. At least in some instances, the second material may form a self-limiting oxide layer. As discussed herein, the self-limiting oxide may reduce the rate at which the material forming the OMWR brazed coating is consumed. In this way, the OWR material may reduce the consumption of the MWR material due to oxidation, thereby increasing the longevity of the component coated with the OMWR brazed coating. Moreover, although the OMWR brazed coating includes two materials (e.g., the MWR material and the OWR material), the thickness of the OMWR brazed coating may be relatively thin (e.g., less than 10 microns), and thus may not significantly alter the dimensions of the component.

Accordingly, technical effects of this disclosure include, and are not limited to, improving the oxidation wear resistance of a coating applied to a substrate. By improving the oxidation wear resistance of the coating, the coating is less likely to oxidize, and therefore form a material that may have a relatively lower mechanical wear resistance thereby improving the longevity of the coating. The machine components, such as bucket interlocks of a gas turbine, that are coated with an OMWR brazed coating may have increased wear resistance while operating at a broad range of temperatures.

This written description uses examples to disclose the subject matter, including the best mode, and also to enable any person skilled in the art to practice the subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Further aspects of the invention are provided by the subject matter of the following clauses:

1. A method, comprising: applying a material coating to a surface of a machine component, wherein the material coating is formed from a combination of a hardfacing material, aluminum-containing particles, and a braze material; and thermally treating the material coating at a temperature to generate an oxide layer comprising aluminum from the aluminum-containing particles, wherein the oxide layer is configured to reduce oxidation of the hardfacing material, and the braze material is configured to facilitate binding between the material coating and the surface of the machine component.
2. The method of any preceding clause, comprising forming a pre-sintered preform (PSP) using a mixture of particles comprising the hardfacing material, the aluminum containing particles, and the braze material; and thermally treating the PSP at an additional temperature to form the material coating and couple the material coating to the surface of the machine component, wherein the additional temperature is higher than the temperature.
3. The method of any preceding clause, wherein the additional temperature is between 1000° C. and 1300° C.
4. The method of any preceding clause, wherein the hardfacing material comprises particles having a first size distribution, the aluminum-containing particles have a second size distribution, and the first size distribution is different than the second size distribution.
5. The method of any preceding clause, wherein the braze material comprises nickel.
6. The method of any preceding clause, wherein the aluminum-containing particles consist essentially of aluminum.
7. The method of any preceding clause, wherein the hardfacing material comprises M-Mo—Cr—Si, where M comprises Ni or Co.
8. The method of any preceding clause, wherein the braze material is configured to wet boron, silicon, or a combination thereof.
9. The method of any preceding clause, wherein approximately 20% of the composition of the material coating is the braze material.
10. A machine component comprising a material coating applied to a surface of the machine component, wherein the material coating comprises: a layer comprising a first plurality of phases of a hardfacing material and an aluminum-containing material, and a second plurality of phases of a braze material, wherein the aluminum-containing material is configured to oxidize to reduce beta depletion of the hardfacing material, and wherein the braze material is configured to couple the layer to the surface of the machine component.
11. The machine component of any preceding clause, wherein the machine component comprises a gas turbine component.
12. The machine component of any preceding clause, wherein a combination of the hardfacing material and the aluminum-containing material comprises approximately 30 percent hardfacing material and approximately 70 percent aluminum based material.
13. The machine component of any preceding clause, wherein the aluminum-containing material comprises aluminum before oxidation.
14. The machine component of any preceding clause, wherein the aluminum-containing material is configured to form an aluminum oxide layer, and the material coating comprises the aluminum oxide layer.
15. The machine component of any preceding clause, wherein the braze material is a nickel-based braze material.
16. The machine component of any preceding clause, wherein the aluminum-containing material comprises CoNiCrAlY particles, aluminum oxide before oxidation, or both.
17. A machine component comprises a material coating, the material coating comprising: a first layer comprising a hardfacing material, an aluminum-containing material, and a nickel-based braze material, wherein the first layer is formed by heat treating a mixture of the hardfacing material, the aluminum-containing material, and the nickel-based braze material at a brazing temperature of the nickel-based braze material to couple the nickel-based braze material with a surface of the machine component; and a second layer formed by heat treatment of the first layer, wherein the second layer comprises crystalline intermetallic phases of the aluminum-containing material.
18. The machine component of any preceding clause, wherein the nickel-based braze material comprises less than 20% chromium.
19. The machine component of any preceding clause, wherein the brazing temperature is between 1000° C. and 1300° C.
20. The machine component of any preceding clause, wherein the hardfacing material comprises CoNiCrAlY particles.

The invention claimed is:

1. A method, comprising:
applying a material coating to a surface of a machine component, wherein the material coating is formed from a combination of a hardfacing material, aluminum-containing particles, and a braze material;
pre-heating the material coating to precipitate a plurality of intermetallic phases based on the aluminum-containing particles, the hardfacing material, and the braze material; and
after pre-heating the material coating, thermally treating the material coating at an oxidizing temperature to oxidize aluminum in the aluminum-containing particles to generate an oxide layer comprising the aluminum in the aluminum-containing particles, wherein the oxide layer is configured to reduce oxidation of the hardfacing material, and the braze material is configured to facilitate binding between the material coating and the surface of the machine component, and wherein the aluminum-containing particles consist essentially of aluminum metal, an aluminum alloy, an aluminum intermetallic species, or a combination thereof.

2. The method of claim 1, comprising forming a pre-sintered preform (PSP) using a mixture of particles comprising the hardfacing material, the aluminum containing particles, and the braze material; and
thermally treating the PSP at an additional temperature, prior to thermally treating the material coating at the oxidizing temperature, to form the material coating and couple the material coating to the surface of the machine component, wherein the additional temperature is higher than the oxidizing temperature.

3. The method of claim 2, wherein the additional temperature is between 1000° C. and 1300° C.

4. The method of claim 1, wherein the hardfacing material comprises particles having a first size distribution, the aluminum-containing particles have a second size distribution, and the first size distribution is different than the second size distribution.

5. The method of claim 1, wherein the braze material comprises nickel.

6. The method of claim 1, wherein the hardfacing material comprises M-Mo—Cr—Si, where M comprises Ni or Co.

7. The method of claim 1, wherein the braze material is configured to wet boron, silicon, or a combination thereof.

8. The method of claim 1, wherein approximately 20% of the composition of the material coating is the braze material.

9. The method of claim 1, wherein the aluminum-containing particles consist essentially of aluminum metal.

* * * * *